Patented Jan. 15, 1924.

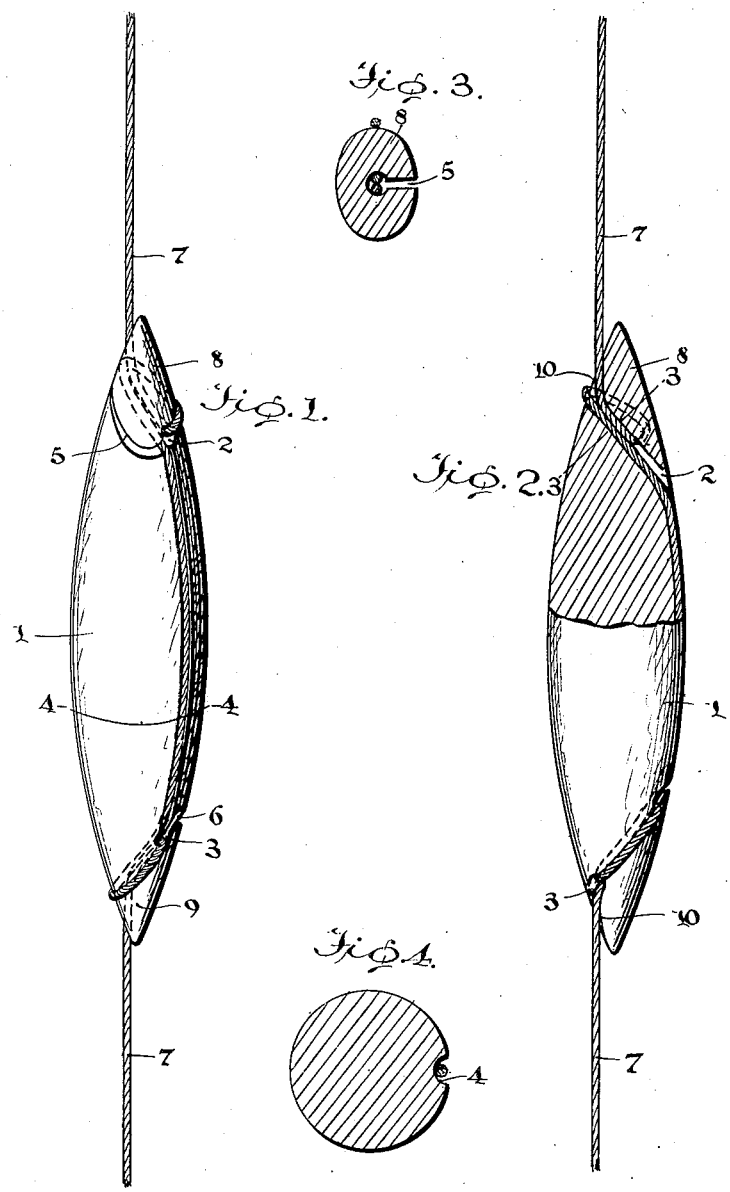

1,480,655

UNITED STATES PATENT OFFICE.

GEORGE EVERETT BENNETT, OF CORRY, PENNSYLVANIA.

FISHING FLOAT.

Application filed December 7, 1921. Serial No. 520,647.

*To all whom it may concern:*

Be it known that I, GEORGE EVERETT BENNETT, a citizen of the United States, and a resident of Corry, in the county of Erie and State of Pennsylvania, have invented certain new and useful Improvements in Fishing Floats, of which the following is a specification.

This invention is a fishing float and relates particularly to the means such a float may be provided with to facilitate its attachment to a fishing line.

The invention has for its object the provision of a float which may be quickly and securely attached to a fishing line and removed from the same without knotting or severing said line, and which at the same time will be simple in construction and cheap to manufacture.

To this end the invention consists of certain new and improved features of construction and combination of parts described in the following specification and illustrated in the accompanying drawing, it being understood that the right is reserved to make such changes in materials and details of construction as fairly fall within the scope of the appended claims.

In the accompanying drawings in which like numerals designate like parts throughout, Figure 1, is a plan view of the float attached to a fishing line.

Figure 2 is a similar view, parts thereof being shown in section.

Figure 3 is a sectional view taken on the line 3—3 of Figure 2.

Figure 4 is a sectional view taken on the line 4—4 of Figure 1.

The invention comprises a float generally indicated by the numeral 1, and which is shown ellipsoidal in form although any other shape may be employed if desired. The float may be made of wood, cork or any suitable buoyant material and is provided with transverse inclined bores 2 and 3 adjacent to its extremities. The bores 2 and 3 are preferably centered in a plane passing through the major axis of the float, and converge toward a point of intersection lying intermediate its ends and outside of the body of the float, the convergent ends of the bores 2 and 3 being connected by a longitudinal connecting groove 4 in the periphery of the float.

An inclined slot or kerf 5 is shown extending from the periphery of the float and communicating with the inclined bore 2. The slot 5 is inclined from the center of the float towards the end and intersects the axis of the bore 2 throughout its length. On the opposite side of the plane passing through the major axis of the float and associated with the bore 3, a similar slot 6 is provided.

A plurality of longitudinal grooves 10 may be provided communicating with the divergent ends of the bores 2 and 3 and extending towards the respectively adjacent ends of the float to assist in guiding and retaining the line 7, to be hereinafter referred to, in proper position with respect to the float.

When it is desired to attach the float to a line, as indicated at 7, the line is placed in the groove 4, and the thumb of the operator placed over it immediately adjacent to the base of the slot 5. The line is then wound through the slot 5, around the end 8 of the float and through the slot 5, a second time. The line is then similarly attached to the opposite end 9 by means of the slot 6, and is then pulled taut along the line of the major axis of the float, causing the line to engage the grooves 10 of the float and the latter to assume the position shown in Figure 1 of the drawing.

As shown in Figure 3 the slots 5 and 6 are of a width substantially equal to the diameter of the line 7, whereas the bores 2 and 3 form enlargements at the bases of the slots to receive the two strands of the line, as hereinbefore described.

From the foregoing it will be seen that a float has been provided which may be quickly attached to a line at any point without knotting or breaking the same, and in which the possibility of accidental detachment from the line is substantially precluded.

I claim:—

1. A float comprising a body provided with an inclined bore adjacent to each of its ends and converging towards each other, a longitudinal groove connecting the bores at their convergent ends, longitudinal grooves extending from the opposite ends of the bores towards the respectively adjacent ends of the body and inclined slots communicating with said bores to admit a connecting line thereinto.

2. The combination with a float having a transverse bore adjacent to each of its ends, said bores being convergently inclined with respect to each other, an inclined slot communicating with each of said bores, and a connecting groove between the bores, of a connecting line wound transversely around the end portion of the float through the slots and into the bores, and lying in the connecting groove between the bores.

3. The combination with a float having a transverse slot adjacent to each of its ends, said slots being convergently inclined with respect to each other, and being provided with a groove connecting said slots, of a connecting line wound transversely round the ends of the float through the slots, and lying in the groove between the slots.

4. A float comprising an ellipsoidal body provided with an inclined kerf adjacent to each of its ends, said kerfs converging towards each other and having their divergent extremities terminating in proximity to the longitudinal axis of the body.

5. A float comprising a body having tapered end portions and being provided with an inclined kerf adjacent to each of its ends, said kerfs converging towards each other, said body being further provided with a longitudinal groove extending from each of its ends to the respectively adjacent divergent extremities of said kerfs.

6. A float comprising a body having tapered end portions and being provided with inclined slots in said tapered portions adjacent to the ends thereof and converging towards each other, said slots being positioned on and extending out through opposite ends of the body, whereby their divergent extremities terminate in proximity to the longitudinal axis of the body.

7. A float comprising a body having a kerf in each end portion thereof, said kerfs being oppositely inclined with respect to each other and extending from opposite sides of the body in convergent relation with respect to each other.

8. A float comprising a body having a kerf in each end portion thereof, said kerfs being oppositely inclined with respect to each other and extending from opposite sides of the body in convergent relation, whereby the divergent extremities thereof terminate in proximity to the longitudinal axis of the body.

GEORGE EVERETT BENNETT.